(12) United States Patent
Hamann et al.

(10) Patent No.: US 11,119,006 B2
(45) Date of Patent: Sep. 14, 2021

(54) METHODS FOR OPERATING AN ELECTROSTATIC PARTICLE SENSOR

(71) Applicant: CPT Group GmbH, Hannover (DE)

(72) Inventors: Christoph Hamann, Thalmassing (DE); Kay Schwarzkopf, Regensburg (DE); Christoph Strobl, Neustadt a. d. Donau (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 145 days.

(21) Appl. No.: 16/487,779

(22) PCT Filed: Feb. 21, 2018

(86) PCT No.: PCT/EP2018/054315
§ 371 (c)(1),
(2) Date: Aug. 21, 2019

(87) PCT Pub. No.: WO2018/153942
PCT Pub. Date: Aug. 30, 2018

(65) Prior Publication Data
US 2019/0376875 A1 Dec. 12, 2019

(30) Foreign Application Priority Data
Feb. 22, 2017 (DE) ...................... 10 2017 202 859.9

(51) Int. Cl.
*G01M 15/10* (2006.01)
*G01N 15/06* (2006.01)
*G01N 15/00* (2006.01)

(52) U.S. Cl.
CPC ...... *G01M 15/102* (2013.01); *G01N 15/0656* (2013.01); *G01N 2015/0046* (2013.01)

(58) Field of Classification Search
CPC ............. G01N 1/2252; G01N 15/0656; G01N 2015/0046; G01M 15/10; G01M 15/102;
(Continued)

(56) References Cited

U.S. PATENT DOCUMENTS 9,541,535 B2 1/2017 Allmendinger
2010/0005880 A1 1/2010 Dieterle ...................... 73/304 R
(Continued)

FOREIGN PATENT DOCUMENTS

DE 195 36 705 4/1997 ............. G01N 15/06

OTHER PUBLICATIONS

Search Report for International Application No. PCT/EP2018/054315, 11 pages, dated Jun. 12, 2018.
(Continued)

*Primary Examiner* — Benjamin R Schmitt
(74) *Attorney, Agent, or Firm* — Slayden Grubert Beard PLLC

(57) ABSTRACT

Various embodiments include a method for operating an electrostatic particle sensor to detect the particle concentration in the exhaust gas of an internal combustion engine, the sensor comprising a first electrode, a second electrode electrically insulated from the first electrode by an insulating body, a guard electrode electrically insulated from the first electrode and from the second electrode by the insulating body, and a voltage supply. The method comprises: applying a first electric potential to the first electrode; applying a second electric potential to the second electrode; applying an guard potential to the guard electrode; and limiting a first leakage current flowing between the first electrode and the guard electrode via the insulating body to a first leakage-current limiting value using a first electrical limiting resistor arranged between the guard electrode and the voltage supply.

10 Claims, 1 Drawing Sheet

(58) Field of Classification Search
CPC .............. F01N 13/008; F01N 2560/02; F01N 2560/05; F02D 41/1438; F02D 41/1493
See application file for complete search history.

(56) References Cited

U.S. PATENT DOCUMENTS

2013/0219990 A1    8/2013   Allmendinger .............. 73/23.31
2019/0024598 A1*   1/2019   Zhang ................. F02D 41/1466

OTHER PUBLICATIONS

Office Action for DE Patent Application No. 10 2017 202 859.9, 5 pages, dated Feb. 21, 2018.

* cited by examiner

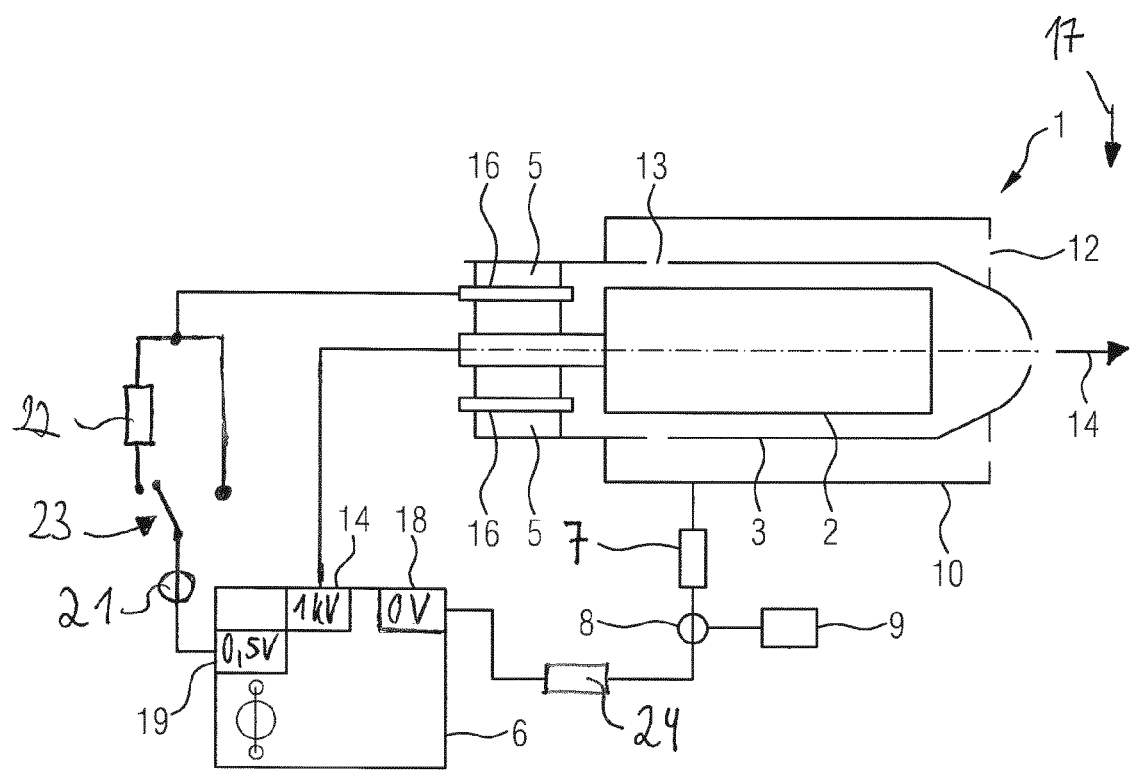

METHODS FOR OPERATING AN ELECTROSTATIC PARTICLE SENSOR

CROSS-REFERENCE TO RELATED APPLICATIONS

This application is a U.S. National Stage Application of International Application No. PCT/EP2018/054315 filed Feb. 21, 2018, which designates the United States of America, and claims priority to DE Application No. 10 2017 202 859.9 filed Feb. 22, 2017, the contents of which are hereby incorporated by reference in their entirety.

TECHNICAL FIELD

The present disclosure relates to sensors. Various embodiments include methods for operating an electrostatic particle sensor and/or electrostatic particle sensors.

BACKGROUND

The reduction of exhaust gas emissions in motor vehicles is an important objective when developing new motor vehicles. Therefore, combustion processes in internal combustion engines are optimized thermodynamically so that the efficiency of the internal combustion engine is significantly improved. In the automotive sector, diesel engines are used which, in a modern design, have very high efficiency. The disadvantage of this combustion technology compared with optimised spark-ignition engines is, however, a significantly increased emission of soot and/or particles. Soot has a highly carcinogenic effect as a result of the accumulation of polycyclic aromatics, which has already prompted various regulations. For example, exhaust gas emission standards with maximum limits for the emission of soot have been issued. To satisfy the exhaust gas emission standards over a wide area for motor vehicles with diesel engines, there is a need to manufacture cost-effective sensors which reliably measure the soot content in the exhaust gas stream of the motor vehicle.

The use of such particle or soot sensors serves to measure the currently emitted soot so that the engine management system in a motor vehicle can be provided with information in a current driving situation in order to reduce the emission values through technical control adjustments. Moreover, the particle sensors can be used to initiate active exhaust gas purification by means of exhaust gas soot filters, or in performing exhaust gas recirculation to the internal combustion engine. In the case of soot filtering, filters which can be regenerated and which filter out a significant part of the soot content from the exhaust gas are used. Particle sensors are required for detecting soot or particles in order to monitor the function of the soot filters and/or in order to control their regeneration cycles.

Particle sensors are also used for checking the proper functioning of particulate filters. In this process, a particle sensor is arranged in the exhaust section of an internal combustion engine preferably downstream of a particle sensor. If the quantity of particles exceeds a predetermined threshold value, this can indicate that a particulate filter is no longer working correctly.

The state of the art presents various approaches to detecting soot. An approach which is widely adopted in laboratories is to use scattering of light by the soot particles. This procedure is suitable for complex measuring devices. If it is attempted also to use this as a mobile sensor system in the exhaust section, it must be borne in mind that approaches for implementing an optical sensor in a motor vehicle entail very high costs. Furthermore, there are unresolved problems relating to dirtying of the required optical windows by combustion exhaust gases.

DE 195 36 705 A1 describes a device for measuring soot particles, wherein an electric field is generated between a cover electrode through which the gas stream flows and an internal electrode within this cover electrode by applying a constant electrical direct voltage, and the charging current for maintaining the constant direct voltage between the cover electrode and the internal electrode is measured.

A problem which occurs when measuring particles using electrostatic particle sensors in the exhaust section of a motor vehicle is that a cold particle sensor, for example after a cooled combustion engine is started, cannot be used for measuring particles, since condensed water from the exhaust gas stream accumulates on and in the soot sensor and initially makes this sensor unstable for high-voltage operation, which rules out reliable measurement of particles. There is always a high proportion of water in the gas phase in the exhaust gas of a combustion engine, since the hydrocarbons, for example from the diesel fuel, burn to form mainly water and carbon dioxide. While the particle sensor is cold, the water condenses from the exhaust gas to form liquid water on the electrodes and the insulating body and therefore disrupts the measurement of soot over a long period.

Therefore, measurement of particles should not begin until after waiting for the particle sensor to warm to such an extent that water can no longer condense out of the exhaust gas stream, and the water which has already condensed out has dried off from the particle sensor. This is the time at which the dew point release, as it is known, takes place for the soot sensor. Only a very imprecise dew point release can take place exclusively on the basis of engine models in connection with a temperature measurement in the exhaust gas stream, since the complete drying of the soot sensor depends on a very large number of factors (for example ambient temperature of the vehicle, air humidity of the intake air, gas mass flow in the exhaust section).

The moisture that has condensed on the insulating components can unintentionally connect electrically, or short-circuit, the electrically conductive components to one another, thereby causing electrical leakage currents. These electrical leakage currents can adversely affect, for example, soldered connections inside the particle sensor, in particular bring about what is known as electromigration and/or solder migration in said soldered connections, which can lead to a deterioration in the durability of the soldered connection. For instance, the insulating components are connected to the electrically conductive components by soldered connections.

Moreover, the electromigration and/or solder migration causes some ions to detach from the soldered connection and to be deposited on the surface of the insulating body. A layer deposited in this manner on the surface of the insulating body can short-circuit the different electrodes and hence cause higher leakage currents. In particular an applied voltage and the moisture on the insulating components promote the electromigration or solder migration. In addition, the high temperatures prevailing in the exhaust gas can encourage the electromigration or solder migration. Thus, the electromigration or solder migration can lead to increased corrosion of the components of the particle sensor.

SUMMARY

The teachings of the present disclosure describe methods for operating an electrostatic particle sensor and electrostatic particle sensors, in which the risk of electromigration or solder migration is reduced and corrosion of the components of the particle sensor is prevented at least in part. For example, some embodiments include a method for operating an electrostatic particle sensor (1), which is designed to detect the particle concentration in the exhaust gas of an internal combustion engine, and which comprises a first electrode (2), a second electrode (3), which is electrically insulated from the first electrode (2) by means of an insulating body (5), a guard electrode (16), which is electrically insulated from the first electrode (2) and from the second electrode (3) by means of the insulating body (5), and a voltage supply (6), which is designed to apply a first electric potential (14) to the first electrode (2), to apply a second electric potential (18) to the second electrode (2) such that a voltage arises between the first electrode (2) and the second electrode (3), and to apply an electric guard potential (19) to the guard electrode (16), during the measurement operation of the particle sensor (1), wherein the method comprises: applying the first electric potential (14) to the first electrode (2), applying the second electric potential (18) to the second electrode (3), and applying the electric guard potential (19) to the guard electrode (16), and limiting a first leakage current, which flows between the first electrode (2) and the guard electrode (16) via the insulating body (5), to a first leakage-current limiting value by means of a first electrical limiting resistor (22), which is arranged between the guard electrode (16) and the voltage supply (6).

Some embodiments include limiting a second leakage current, which flows between the guard electrode (16) and the second electrode (3) via the insulating body (5), by means of a second electrical limiting resistor (24), which is arranged between the second electrode (3) and the voltage supply (6).

Some embodiments include: detecting the first leakage current, which flows between the first electrode (2) and the guard electrode (16) via the insulating body (5), and disconnecting the first electrode (2) from the first electric potential (14) and disconnecting the guard electrode (16) from the guard potential (19) if the detected first leakage current exceeds a predetermined first leakage-current threshold value.

In some embodiments, the first electrode (2) is disconnected from the first electric potential (14) and the guard electrode (16) is disconnected from the guard potential (19) until the detected first leakage current falls below the predetermined first leakage-current threshold value again.

In some embodiments, the first electrode (2) is disconnected from the first electric potential (14) and the guard electrode is disconnected (16) from the guard potential (19) in each case for at least a first predetermined timespan.

Some embodiments include: detecting a second leakage current, which flows between the second electrode (3) and the guard electrode (16) via the insulating body (5), and disconnecting the guard electrode (16) from the guard potential (19) and disconnecting the second electrode (3) from the second electric potential (18) if the detected second leakage current exceeds a predetermined second leakage-current threshold value.

In some embodiments, the guard electrode (16) is disconnected from the guard potential (19), and the second electrode (3) is disconnected from the second electric potential (18) until the detected second leakage current falls below the predetermined second leakage-current threshold value again.

In some embodiments, the guard electrode (16) is disconnected from the guard potential (19), and the second electrode (3) is disconnected from the second electric potential (18) in each case for at least a second predetermined timespan.

As another example, some embodiments include an electrostatic particle sensor (1) for detecting the particle concentration in the exhaust gas of an internal combustion engine, wherein the electrostatic particle sensor (1) comprises: a first electrode (2), a second electrode (3), which is electrically insulated from the first electrode (2) by means of an insulating body (5), a guard electrode (16), which is electrically insulated from the first electrode (2) and from the second electrode (3) by means of the insulating body (5), a voltage supply (6), which is designed to apply a first electric potential (14) to the first electrode (2), to apply a second electric potential (18) to the second electrode (2) such that a voltage arises between the first electrode (2) and the second electrode (3), and to apply an electric guard potential (19) to the guard electrode (16), and a first electrical limiting resistor (22), which is arranged between the guard electrode (16) and the voltage supply (6), for limiting a first leakage current, which flows between the first electrode (2) and the guard electrode (16) via the insulating body (5).

In some embodiments, there is a second electrical limiting resistor (24), which is arranged between the second electrode (3) and the voltage supply (6), for limiting a second leakage current, which flows between the guard electrode (16) and the second electrode (3) via the insulating body (5).

BRIEF DESCRIPTION OF THE DRAWINGS

Further objects and features of the teachings of the present disclosure will become apparent to a person skilled in the art by practising the described teaching and by taking into consideration the single accompanying FIGURE, which shows a particle sensor incorporating teachings of the present disclosure.

DETAILED DESCRIPTION

Some embodiments include a method for operating an electrostatic particle sensor, which is designed to detect the particle concentration in the exhaust gas of an internal combustion engine, and which comprises a first electrode, a second electrode, which is electrically insulated from the first electrode by means of an insulating body, a guard electrode, which is electrically insulated from the first electrode and from the second electrode by means of the insulating body, and a voltage supply, which is designed to apply a first electric potential to the first electrode, to apply a second electric potential to the second electrode such that a voltage arises between the first electrode and the second electrode, and to apply an electric guard potential to the guard electrode, during the measurement operation of the particle sensor. The method according to the invention comprises applying the first electric potential to the first electrode, applying the second electric potential to the second electrode, and applying the electric guard potential to the guard electrode, and limiting a first leakage current, which flows between the first electrode and the guard electrode via the insulating body, to a first leakage-current limiting value by means of a first electrical limiting resistor, which is arranged between the guard electrode and the voltage supply.

Said first electrical limiting resistor is a separate electrical resistor, which is a separate component and is independent of the inherent internal resistances of the plurality of components of the particle sensor 1, for instance components such as the guard electrode, first electrode, second electrode and insulating body.

Some embodiments include limiting to a predetermined leakage-current limiting value the leakage currents flowing via the insulating body, whereby the corrosion of the components of the particle sensor 1 can be reduced at least in part. The predetermined leakage-current limiting value is significantly smaller than the leakage current flowing as a maximum, which is the maximum leakage current that can result from the applied voltage potentials. The leakage currents are limited here by means of at least one electrical limiting resistor.

In some embodiments, a method also comprises limiting a second leakage current, which flows between the guard electrode and the second electrode via the insulating body, by means of a second electrical limiting resistor, which is arranged between the second electrode and the voltage supply.

Some embodiments include detecting the first leakage current, which flows between the first electrode and the guard electrode via the insulating body, and disconnecting the first electrode from the first electric potential and disconnecting the guard electrode from the guard potential if the detected first leakage current exceeds a predetermined first leakage-current threshold value. In some embodiments, the first electrode is disconnected from the first electric potential and the guard electrode is disconnected from the guard potential until the detected first leakage current falls below the predetermined first leakage-current threshold value again. In some embodiments, the first electrode is disconnected from the first electric potential and the guard electrode is disconnected from the guard potential in each case for at least a first predetermined timespan.

Some embodiments include detecting a second leakage current, which flows between the second electrode and the guard electrode via the insulating body, and disconnecting the guard electrode from the guard potential and disconnecting the second electrode from the second electric potential if the detected second leakage current exceeds a predetermined second leakage-current threshold value. In some embodiments, the guard electrode is disconnected from the guard potential, and the second electrode is disconnected from the second electric potential until the detected second leakage current falls below the predetermined second leakage-current threshold value again. In some embodiments, the guard electrode is disconnected from the guard potential, and the second electrode is disconnected from the second electric potential in each case for at least a second predetermined timespan.

Some embodiments include an electrostatic particle sensor for detecting the particle concentration in the exhaust gas of an internal combustion engine. In some embodiments, there are a first electrode, a second electrode, which is electrically insulated from the first electrode by means of an insulating body, a guard electrode, which is electrically insulated from the first electrode and from the second electrode by means of the insulating body, a voltage supply, which is designed to apply a first electric potential to the first electrode, to apply a second electric potential to the second electrode such that a voltage arises between the first electrode and the second electrode, and to apply an electric guard potential to the guard electrode, and a first electrical limiting resistor, which is arranged between the guard electrode and the voltage supply, for limiting a first leakage current, which flows between the first electrode and the guard electrode via the insulating body.

In some embodiments, there is a second electrical limiting resistor, which is arranged between the second electrode and the voltage supply, for limiting a second leakage current, which flows between the guard electrode and the second electrode via the insulating body. In some embodiments, the leakage current flowing via the insulating body can be actively adjusted by open-loop/closed-loop control to a low value, which is less than the predetermined leakage-current threshold value. In this case, the closed-loop control can be performed by means of a MOSFET.

The FIGURE shows a particle sensor 1. The particle sensor 1 is composed of a first electrode 2, which is arranged inside a second electrode 3. An exhaust gas 17 of an internal combustion engine (not shown here), which exhaust gas contains soot particles, is located between the first electrode 2 and the second electrode 3. The concentration of the soot particles in the exhaust gas 17 is to be measured by the particle sensor 1. In other words, the particle sensor 1 is intended to determine the particle content in the exhaust gas stream 17. This is done by a voltage supply 6 applying a measuring voltage between the first electrode 2 and the second electrode 3. This voltage results from a first electric potential, which is applied to the first electrode 2, and from a second electric potential which is applied to the second electrode 3. The first electrode 2 is electrically insulated from the second electrode 3 by means of an insulating body 5. The insulating body can be embodied, for example, as a disk made of a ceramic material.

Moreover, a guard electrode 16, which is electrically insulated from the first electrode 2 and the second electrode 3, is arranged in the particle sensor 1, which guard electrode preferably is mounted on the insulating body 5 and is used primarily to stabilise the voltage conditions and electric potentials in the particle sensor 1, and ensures that any electrical leakage currents between the first electrode 2 and the second electrode 3 can be diverted away during the measurement operation of the particle sensor 1.

The FIGURE also shows a protective cap 10, which serves to guide the exhaust gas stream 17 deliberately through the particle sensor 1. The exhaust gases can, for example, enter the particle sensor 1 through a first opening 12 in the protective cap, and flow via a second opening 13, which is formed in the second electrode 3, into a measuring region, where the particle content in the exhaust gas can be measured between the first electrode 2 and the second electrode 3. Thereafter, the exhaust gas stream 17 exits the particle sensor 1 through a third opening 14, which is provided in the second electrode 3, and is fed back into the main exhaust gas stream 17.

During the measurement operation of the particle sensor 6, a guard potential 19 can be applied to the guard electrode 16 by the voltage supply 6. A current which can be evaluated as an indicator for a dew point release of the particle sensor 1 can be measured by the guard electrode 16 before the time of the dew point release. The voltage at the first electrode 2 (in this example 1000 V) drives the leakage current via the damp insulating body 5 towards the guard electrode 16, which in this example is biased by 0.5 V slightly with respect to the ground potential of 0 V at the second electrode 3. It cannot be inferred that the particle sensor 1 has dried completely, nor can a dew point release take place, until this leakage current drops significantly, i.e. by at least a power of ten, after the cold combustion engine is started.

Electrical leakage currents are unwanted currents which flow via the insulating body 5 during the measurement operation of the particle sensor 1 as a result of insufficient insulation properties, and hence can corrupt the measurement results of the particle sensor 1 significantly. During the measurement operation of the particle sensor 1, the first electric potential 14, which is applied to the first electrode 2, is preferably set far above the second electric potential 18, which is applied to the second electrode 3, and far above the guard potential 19, which is applied to the guard electrode 16. Any first leakage currents that may exist thereby flow from the first electrode 2 to the guard electrode 16 and are diverted away there.

Moreover, the guard potential 19 of the guard electrode 16 is preferably set slightly above the second electric potential 18 of the second electrode 3. Any second leakage currents that may exist thereby flow from the guard electrode 16 to the second electrode 3. In an example of a measuring configuration, the first electrode is at a very high potential, e.g. 1000 V, the second electrode 3 is at ground potential, i.e. at 0 V, and the guard electrode 16 is at a slightly raised potential, e.g. at 0.5 V.

The FIGURE shows that a first electrical limiting resistor 22, which can be connected in by means of a switch 23, is arranged between the voltage supply 6 and the guard electrode 16. In some embodiments, the first electrical limiting resistor 22 is provided permanently between the voltage supply 6 and the guard electrode 16. The first leakage currents, which flows from the first electrode 2 via the insulating body 5 to the guard electrode 16, can be detected by a first current-measuring element 21.

In some embodiments, the first electrical limiting resistor 22 is a separate electrical resistor, which is a separate component and is independent of the inherent internal resistances of the plurality of components of the particle sensor 1, for instance components such as the guard electrode 16, first electrode 2, second electrode 3 and insulating body 5. The inherent internal resistance of the insulating body 5, via the surface of which the leakage current flows, can depend, for example, on the temperature of the insulating body 5, on the degree of soiling of the surface of the insulating body 5, or on the material of the insulating body 5. The first limiting resistor 22, however, is an electrical resistor that is additional to, separate from, and independent of, this inherent internal resistance.

An electrical resistor 7, which in the embodiment shown is designed to have a high resistance in order to measure the relatively small currents which can develop owing to the soot particles 4 between the first electrode 2 and the second electrode 3, is provided between the voltage supply 6 and the second electrode 3. These second leakage currents are measured by a second current-measuring element 8, which is connected to evaluation electronics 9.

The FIGURE also shows that connected between the voltage supply 6 and the second electrode 3 is a second electrical limiting resistor 24, which, like the first electrical limiting resistor 22, is an electrical resistor that is separate from the internal resistance of the components of the particle sensor 1. The second leakage currents, which flow from the guard electrode 16 via the insulating body 5 to the second electrode 3, can be detected by the second current-measuring element 8. For example, the first electrical limiting resistor 22 and/or the second electrical limiting resistor have a resistance value that lies in the range of 0.1 GΩ to approximately 10 GΩ.

The voltage that is applied between the first electrode 2 and the second electrode 3 is relatively high, in order to obtain usable measuring currents. Said voltage lies between 100 V and 3000 V and is therefore relatively complex to control. In particular, accumulations of water on the first electrode 2 and the second electrode 3, and on the insulating body 5, can result in the particle measurement being corrupted completely. In addition, the first and second leakage currents flowing via the insulating body 5 can cause excessive corrosion of the components of the particle sensor 1 and also lead to electromigration and/or solder migration in the soldered connections of the particle sensor 1. Therefore, before the measurement starts, the particle sensor 1 must have dried completely, something that can be signalled by what is referred to as the dew point release.

Soot particles which are transported in the exhaust gas stream 17 of the internal combustion engine through an exhaust pipe can enter the particle sensor 1, which is integrated in the exhaust section. The soot particles enter an electric field formed between the first electrode 2 and the second electrode 3 as a result of the applied voltage. When the breakdown field strength of the gas is exceeded, electrically charged particles are formed, which are accelerated towards the opposite electrode, and owing to impact ionizations give rise to an avalanche-like formation of charge carriers. If this charge carrier avalanche reaches an electrode surface, a very high current can be measured, which can be evaluated easily and is proportional to the number of charged particles in the exhaust gas.

By applying the first potential 14 to the first electrode 2 and applying the significantly lower guard potential 19 to the guard electrode 16, the first leakage currents are diverted from the first electrode 2 to the guard electrode 16. Furthermore, by applying the guard potential 19 to the guard electrode 16, and by applying the second potential 18 to the second electrode 3, the second leakage currents are diverted almost entirely from the guard electrode 16 to the second electrode 3.

In this example, the guard electrode 16 is integrated in the ceramic insulating body 5 of the particle sensor 1. The insulating body 5 need not necessarily be composed of a ceramic, however. It is also conceivable, for example, to use a heat-proof plastics material or other insulating materials, for instance materials made from the element carbon in a suitable crystal lattice structure, which results in high insulation.

The first and/or second leakage currents can result in what is known as electromigration and/or solder migration in soldered connections in the particle sensor 1, by means of which, for example, the first electrode 2 is connected to the insulating body 5. The electromigration and/or solder migration can cause the soldered connections to detach and/or can result in unnecessarily severe corrosion of the components of the particle sensor 1.

In some embodiments, during the measurement operation of the particle sensor 1, the first electrical limiting resistor 22 is connected in, which resistor is designed to limit the first leakage current, which flows between the first electrode 2 and the guard electrode 16 via the insulating body 5, to a first leakage-current limiting value. The first leakage-current limiting value equals, for example, approximately 1 $\mu A/cm^2$ and is preferably significantly smaller than a maximum first leakage current which without said first limiting resistor 22 would flow between the first electrode 2 and the guard electrode 16 via the insulating body 5. Limiting the first leakage current can reduce the electromigration and/or solder migration of the soldered connections at least in part and prevent the corrosion of the components of the particle sensor at least in part.

In some embodiments, the second limiting resistor 24 can be designed to limit the second leakage current, which flows between the second electrode 3 and the guard electrode 16 via the insulating body 5, to a second leakage-current limiting value. The second leakage-current limiting value equals, for example, approximately 1 µA/cm² and is preferably significantly smaller than a second leakage current which without said second limiting resistor 24 would flow between the second electrode 3 and the guard electrode 16 via the insulating body 5. Limiting the second leakage current can reduce the electromigration and/or solder migration of the soldered connections at least in part and prevent the corrosion of the components of the particle sensor 1 at least in part.

In some embodiments, the first and second leakage-current limiting values are selected to be greater than a first and second leakage-current threshold value respectively. According to the invention, if the first or second leakage current exceeds the first or second leakage-current limiting value respectively, but at the same time remains below the first or second leakage-current limiting value respectively, the measurement operation of the particle sensor 1 is suspended, for instance for a predetermined first or second timespan respectively. Once the first or second timespan has elapsed, the voltage supply applies again all the potentials so that the particle sensor 1 is again ready to measure. If then after the predetermined first or second timespan has elapsed, the first or second leakage current respectively has dropped below the associated first or second leakage-current threshold value again, the particle sensor 1 can be operated again in the standard way. If not, the measurement operation of the particle sensor 1 continues to be suspended until the first or second leakage current has dropped below the associated first or second leakage-current threshold value.

Some embodiments include a method for operating an electrostatic particle sensor, which particle sensor is designed to detect the particle concentration in the exhaust gas of an internal combustion engine. The particle sensor comprises a first electrode, a second electrode, which is electrically insulated from the first electrode by means of an insulating body, a guard electrode, which is electrically insulated from the first electrode and from the second electrode by means of the insulating body, and a voltage supply, which is designed to apply a first electric potential to the first electrode, to apply a second electric potential to the second electrode such that a voltage arises between the first electrode and the second electrode, and to apply an electric guard potential to the guard electrode, during the measurement operation of the particle sensor. Said alternative method comprises applying the first electric potential to the first electrode, applying the second electric potential to the second electrode, and applying the electric guard potential to the guard electrode. Said alternative method also comprises detecting a leakage current flowing via the insulating body, and disconnecting the first electric potential from the first electrode, disconnecting the second electric potential from the second electrode, and disconnecting the electric guard potential from the guard electrode, if the detected leakage current exceeds a predetermined leakage-current threshold value.

In some embodiments, the first electrode, the second electrode and the guard electrode are each disconnected from the associated potential for a predetermined timespan. Once this timespan has elapsed, the associated potentials are applied again to the first electrode, to the second electrode and to the guard electrode respectively, and the leakage current flowing via the insulating body is detected once more. If then this detected leakage current is again below the leakage-current threshold value, the particle sensor can be switched into measurement operation, and the actual particle measurement can take place. If then, however, then the detected leakage current is again below the leakage-current threshold value Thus, some embodiments include quantitatively detecting the first or second leakage current rather than limiting the first or second leakage current, and suspending the measurement operation of the particle sensor 1 when the first or second leakage current exceeds a predetermined first or second leakage-current limiting value respectively. If this is the case, the measurement operation of the particle sensor 1 is suspended until the first or second leakage current has dropped again below the associated first or second leakage-current threshold value.

For example, this may be done by suspending the measurement operation of the particle sensor 1 for a predetermined first or second timespan, e.g. for approximately 30 s. Once the predetermined first or second timespan has elapsed, the particle sensor 1 is switched again into measurement operation by applying all the electric potentials. If the first or second leakage current is then below the associated first or second leakage-current limiting value, the particle measurement can be continued as usual. If, however, the first or second leakage current has still not dropped below the associated first or second leakage-current limiting value, the measurement operation of the particle sensor should continue to remain suspended, because otherwise the corrosion of the components of the particle sensor 1 may be unnecessarily high. The measurement operation of the particle sensor 1 is not started until the first or second leakage current has dropped below the associated first or second leakage-current limiting value.

What is claimed is:

1. A method for operating an electrostatic particle sensor to detect the particle concentration in the exhaust gas of an internal combustion engine, the sensor comprising a first electrode, a second electrode electrically insulated from the first electrode by an insulating body, a guard electrode electrically insulated from the first electrode and from the second electrode by the insulating body, and a voltage supply, wherein the method comprises:

applying a first electric potential to the first electrode;
    applying a second electric potential to the second electrode, wherein the second electric potential is at ground;
    applying an electric guard potential to the guard electrode, wherein the electric guard potential is a positive non-zero potential; and
    limiting a first leakage current flowing between the first electrode and the guard electrode via the insulating body to a first leakage-current limiting value using a first electrical limiting resistor arranged between the guard electrode and the voltage supply.

2. The method as claimed in claim 1, further comprising limiting a second leakage current flowing between the guard electrode and the second electrode via the insulating body using a second electrical limiting resistor arranged between the second electrode and the voltage supply.

3. The method as claimed in claim 1, further comprising:
    detecting the first leakage current and, if the detected first leakage current exceeds a predetermined first leakage-current threshold value:
    disconnecting the first electrode from the first electric potential; and
    disconnecting the guard electrode from the guard potential.

4. The method as claimed in claim 3, wherein the first electrode is disconnected from the first electric potential and the guard electrode is disconnected from the guard potential until the detected first leakage current falls below the predetermined first leakage-current threshold value again.

5. The method as claimed in claim 4, wherein the first electrode is disconnected from the first electric potential and the guard electrode is disconnected from the guard potential for at least a first predetermined timespan.

6. The method as claimed in claim 1, further comprising:
detecting a second leakage current flowing between the second electrode and the guard electrode via the insulating body and, if the detected second leakage current exceeds a predetermined second leakage-current threshold value:
disconnecting the guard electrode from the guard potential and
disconnecting the second electrode from the second electric potential.

7. The method as claimed in claim 6, wherein the guard electrode is disconnected from the guard potential and the second electrode is disconnected from the second electric potential until the detected second leakage current falls below the predetermined second leakage-current threshold value again.

8. The method as claimed in claim 7, wherein the guard electrode is disconnected from the guard potential and the second electrode is disconnected from the second electric potential for at least a second predetermined timespan.

9. An electrostatic particle sensor for detecting a particle concentration in an exhaust gas of an internal combustion engine, the sensor comprising:
a first electrode;
a second electrode;
an insulating body electrically insulating the second electrode from the first electrode; a guard electrode electrically insulated from the first electrode and from the second electrode by means of the insulating body;
a voltage supply configured to apply a first electric potential to the first electrode, to apply a second electric potential to the second electrode, and to apply an electric guard potential to the guard electrode, wherein the second electric potential is at ground, wherein the electric guard potential is a positive non-zero potential; and
a first electrical limiting resistor arranged between the guard electrode and the voltage supply for limiting a first leakage current flowing between the first electrode and the guard electrode via the insulating body.

10. The electrostatic particle sensor as claimed in claim 9, further comprising a second electrical limiting resistor arranged between the second electrode and the voltage supply for limiting a second leakage current flowing between the guard electrode and the second electrode via the insulating body.

* * * * *